US012554333B2

(12) United States Patent
Miller et al.

(10) Patent No.: US 12,554,333 B2
(45) Date of Patent: Feb. 17, 2026

(54) HAND-GESTURE ACTIVATION OF ACTIONABLE ITEMS

(71) Applicant: Apple Inc., Cupertino, CA (US)

(72) Inventors: Brett D. Miller, San Carlos, CA (US); Daniel K. Boothe, San Francisco, CA (US); Martin E. Johnson, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/211,507

(22) Filed: Jun. 19, 2023

(65) Prior Publication Data

US 2023/0409122 A1    Dec. 21, 2023

Related U.S. Application Data

(60) Provisional application No. 63/354,007, filed on Jun. 21, 2022.

(51) Int. Cl.
| | |
|---|---|
| *G06F 3/048* | (2013.01) |
| *G06F 3/01* | (2006.01) |
| *G06F 3/16* | (2006.01) |

(52) U.S. Cl.
CPC .............. *G06F 3/017* (2013.01); *G06F 3/011* (2013.01); *G06F 3/167* (2013.01)

(58) Field of Classification Search
CPC ........... G06F 3/017; G06F 3/011; G06F 3/167
See application file for complete search history.

(56) References Cited

U.S. PATENT DOCUMENTS

| | | | |
|---|---|---|---|
| 9,317,124 B2 | 4/2016 | Kongqiao et al. | |
| 10,362,299 B1* | 7/2019 | Niemeyer | G06F 3/011 |
| 10,466,794 B2 | 11/2019 | Maeda et al. | |
| 11,783,548 B2* | 10/2023 | Richter | H04N 21/8113 |
| | | | 345/633 |
| 11,842,729 B1* | 12/2023 | Richter | G10H 1/0008 |
| 2012/0249741 A1* | 10/2012 | Maciocci | G06F 19/006 |
| | | | 348/51 |
| 2013/0194259 A1* | 8/2013 | Bennett | G06T 19/006 |
| | | | 345/420 |
| 2014/0062962 A1* | 3/2014 | Jang | G06F 3/04883 |
| | | | 345/175 |

(Continued)

OTHER PUBLICATIONS

Ajune et al., Augmented Reality Real-time Drawing Application with a Hand Gesture on a Handheld Interface, 2021, IEEE,6 pages. (Year: 2021).*

(Continued)

*Primary Examiner* — Linh K Pham
(74) *Attorney, Agent, or Firm* — Fernando & Partners, LLP

(57) ABSTRACT

In one implementation, a method of performing an action is performed at a device including an image sensor, one or more processors, and non-transitory memory. The method includes receiving, from the image sensor, one or more images of a physical environment. The method includes detecting, in the one or more images of the physical environment, one or more actionable items respectively associated with one or more actions. The method includes detecting, in the one or more images of the physical environment, a hand gesture indicating a particular actionable item. The method includes in response to detecting the hand gesture, performing an action associated with the particular actionable item.

20 Claims, 16 Drawing Sheets

(56) References Cited

U.S. PATENT DOCUMENTS

| | | | |
|---|---|---|---|
| 2014/0152557 A1 | 6/2014 | Yamamoto et al. | |
| 2015/0062165 A1* | 3/2015 | Saito | G06F 3/011 |
| | | | 382/203 |
| 2015/0103003 A1* | 4/2015 | Kerr | G06F 3/0488 |
| | | | 345/158 |
| 2016/0313902 A1* | 10/2016 | Hill | G06F 3/0482 |
| 2017/0287218 A1* | 10/2017 | Nuernberger | G06F 3/04845 |
| 2019/0019515 A1 | 1/2019 | Kim et al. | |
| 2019/0087015 A1* | 3/2019 | Lam | A63F 13/213 |
| 2019/0250716 A1 | 8/2019 | Kim | |
| 2019/0333278 A1* | 10/2019 | Palangie | G06T 19/20 |
| 2019/0369714 A1* | 12/2019 | Pla I. Conesa | G06F 3/0304 |
| 2019/0391666 A1 | 12/2019 | Kim | |
| 2020/0097083 A1* | 3/2020 | Mao | G06F 3/017 |
| 2020/0117336 A1* | 4/2020 | Mani | F25B 49/005 |
| 2021/0097766 A1* | 4/2021 | Palangie | G06F 3/017 |
| 2021/0097768 A1* | 4/2021 | Malia | G06F 3/04845 |
| 2021/0097776 A1* | 4/2021 | Faulkner | G06V 40/113 |
| 2021/0149496 A1* | 5/2021 | Sen | G06T 7/20 |
| 2021/0192802 A1* | 6/2021 | Nepveu | H04N 13/117 |
| 2021/0232232 A1 | 7/2021 | Wang et al. | |
| 2023/0297607 A1* | 9/2023 | Salter | G06F 16/5846 |
| | | | 707/769 |
| 2023/0409122 A1* | 12/2023 | Miller | G06F 3/017 |
| 2024/0070931 A1* | 2/2024 | Lozada | G06T 3/02 |
| 2024/0201787 A1* | 6/2024 | Medarametla Lakshmi | G06F 3/017 |

OTHER PUBLICATIONS

Rani et al., Hand Gesture Control of Virtual Object in Augmented Reality, 2017, IEEE, 6 pages. (Year: 2017).*

Extended European Search Report dated Oct. 24, 2023, EP Application No. 23180382.6, pp. 1-11.

* cited by examiner

HAND-GESTURE ACTIVATION OF ACTIONABLE ITEMS

CROSS-REFERENCE TO RELATED APPLICATIONS

This application claims priority to U.S. Provisional Patent App. No. 63/354,007, filed on Jun. 21, 2022, which is hereby incorporated by reference in its entirety.

TECHNICAL FIELD

The present disclosure generally relates to performing actions associated with actionable items based on hand gestures.

BACKGROUND

In various implementations, in response to detecting an actionable item associated with an action, a device displays a glint in association with the actionable item. In response to interaction with the glint, the device performs the action. However, it may be desirable for a device lacking a display to perform actions associated with actionable items.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
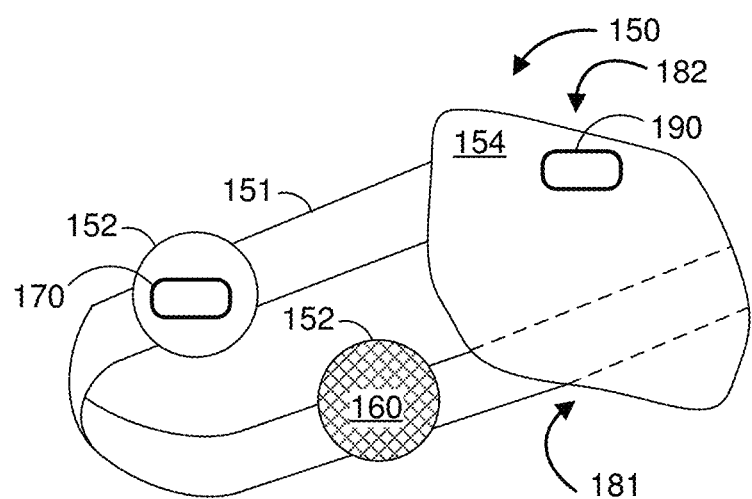
FIG. 1 is a perspective view of a head-mounted device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for performing an action. In various implementations, the method is performed by a device including an image sensor, one or more processors, and non-transitory memory. The method includes receiving, from the image sensor, one or more images of a physical environment. The method includes detecting, in the one or more images of the physical environment, one or more actionable items respectively associated with one or more actions. The method includes detecting, in the one or more images of the physical environment, a hand gesture indicating a particular actionable item. The method includes in response to detecting the hand gesture, performing an action associated with the particular actionable item.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

In various implementations, in response to detecting an actionable item associated with an action, a device displays a glint in association with the actionable item. In response to interaction with the glint, the device performs the action. However, it may be desirable for a device lacking a display to perform actions associated with actionable items. Accordingly, in various implementations, the device detects a hand gesture interacting with the actionable item itself (rather than a displayed glint) and performs the action based on detecting the hand gesture (and, in various implementations, a vocal command).

FIG. 1 illustrates a perspective view of a head-mounted device 150 in accordance with some implementations. The head-mounted device 150 includes a frame 151 including two earpieces 152 each configured to abut a respective outer ear of a user. The frame 151 further includes a front component 154 configured to reside in front of a field-of-view of the user. Each earpiece 152 includes an inward-facing speaker 160 (e.g., inward-facing, outward-facing, downward-facing, or the like) and an outward-facing imaging system 170. Further, the front component 154 includes a display 181 to display images to the user, an eye tracker 182 (which may include one or more rearward-facing image sensors configured to capture images of at least one eye of the user) to determine a gaze direction or point-of-regard of the user, and a scene tracker 190 (which may include one or more forward-facing image sensors configured to capture images of the physical environment) which may supplement the imaging systems 170 of the earpieces 152.

In various implementations, the head-mounted device 150 lacks the front component 154. Thus, in various implementations, the head-mounted device is embodied as a headphone device including a frame 151 with two earpieces 152 each configured to surround a respective outer ear of a user and a headband coupling the earpieces 152 and configured to rest on the top of the head of the user. In various implementations, each earpiece 152 includes an inward-facing speaker 160 and an outward-facing imaging system 170.

In various implementations, the headphone device lacks a headband. Thus, in various implementations, the head-mounted device 150 (or the earpieces 152 thereof) is embodied as one or more earbuds or earphones. For example, an earbud includes a frame configured for insertion into an outer ear. In particular, in various implementations, the frame is configured for insertion into the outer ear of a human, a person, and/or a user of the earbud. The earbud includes, coupled to the frame, a speaker 160 configured to output sound, and an imaging system 170 configured to capture one or more images of a physical environment in which the earbud is present. In various implementations, the imaging system 170 includes one or more cameras (or image sensors). The earbud further includes, coupled to the frame, one or more processors. The speaker 160 is configured to output sound based on audio data received from the one or more processors and the imaging system 170 is configured to provide image data to the one or more processors. In various implementations, the audio data provided to the speaker 160 is based on the image data obtained from the imaging system 170.

As noted above, in various implementations an earbud includes a frame configured for insertion in an outer ear. In particular, in various implementations, the frame is sized and/or shaped for insertion into the outer ear. The frame includes a surface that rests in the intertragic notch, preventing the earbud from falling downward vertically. Further, the frame includes a surface that abuts the tragus and the anti-tragus, holding the ear-mounted device in place horizontally. As inserted, the speaker 160 of the earbud is pointed toward the ear canal and the imaging system 170 of the earbud is pointed outward and exposed to the physical environment.

Whereas the head-mounted device 150 is an example device that may perform one or more of the methods described herein, it should be appreciated that other wearable devices having one or more speakers and one or more cameras can also be used to perform the methods. The wearable audio devices may be embodied in other wired or wireless form factors, such as head-mounted devices, in-ear devices, circumaural devices, supra-aural devices, open-back devices, closed-back devices, bone conduction devices, or other audio devices.

Figure 2:
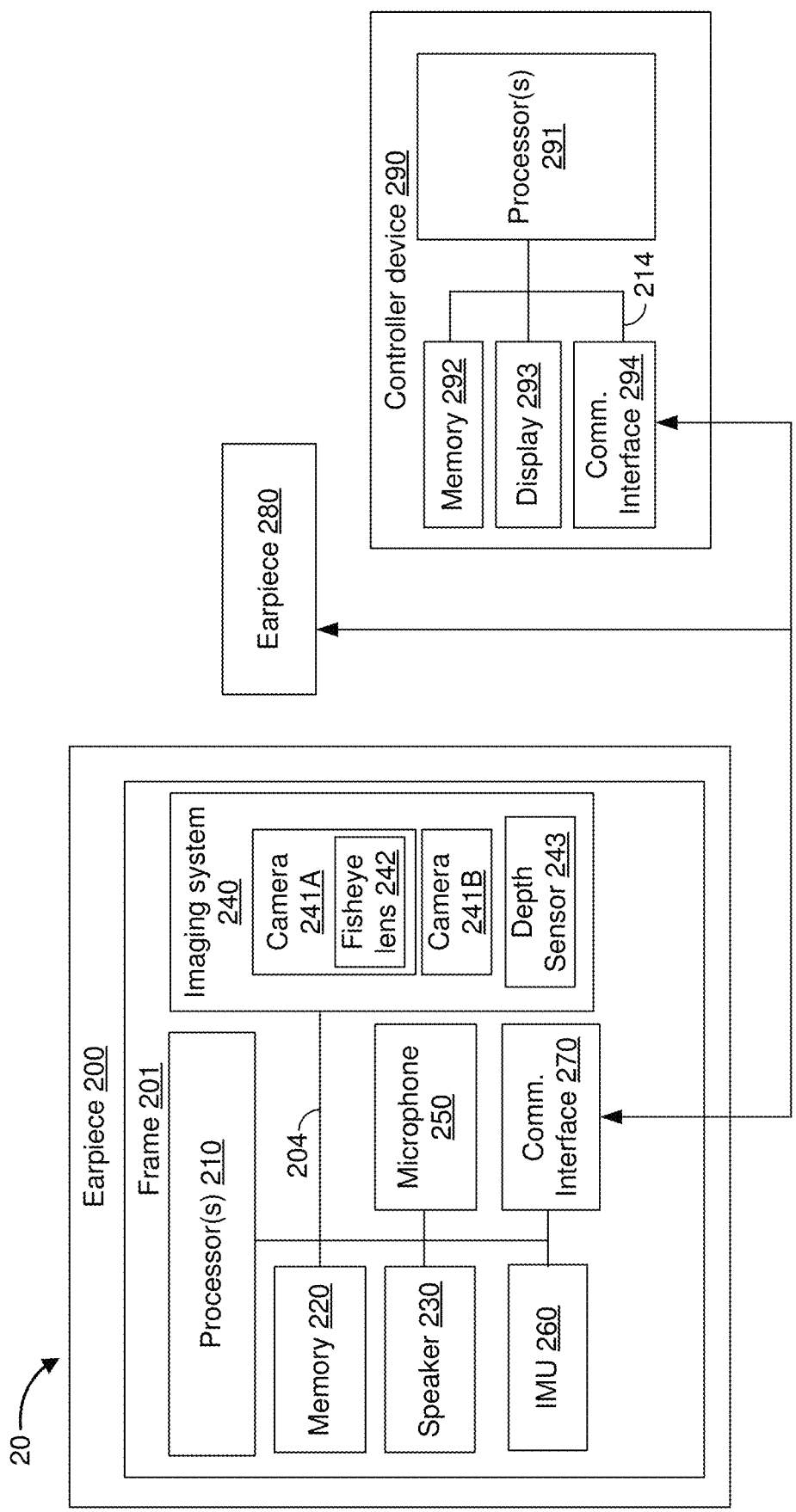
FIG. 2 is a block diagram of an example operating environment in accordance with some implementations.

FIG. 2 is a block diagram of an operating environment 20 in accordance with some implementations. The operating environment 20 includes an earpiece 200. In various implementations, the earpiece 200 corresponds to the earpiece 152 of FIG. 1. The earpiece 200 includes a frame 201. In various implementations, the frame 201 is configured for insertion into an outer ear. The earpiece 200 includes, coupled to the frame 201 and, in various implementations, within the frame 201, one or more processors 210. The earpiece 200 includes, coupled to the frame 201 and, in various implementations, within the frame 201, memory 220 (e.g., non-transitory memory) coupled to the one or more processors 210.

The earpiece 200 includes a speaker 230 coupled to the frame 201 and configured to output sound based on audio data received from the one or more processors 210. The earpiece 200 includes an imaging system 240 coupled to the frame 201 and configured to capture images of a physical environment in which the earpiece 200 is present and provide image data representative of the images to the one or more processors 210. In various implementations, the imaging system 240 includes one or more cameras 241A, 241B. In various implementations, different cameras 241A, 241B have a different field-of-view. For example, in various implementations, the imaging system 240 includes a forward-facing camera and a rearward-facing camera. In various implementations, at least one of the cameras 241A includes a fisheye lens 242, e.g., to increase a size of the field-of-view of the camera 241A. In various implementations, the imaging system 240 includes a depth sensor 243. Thus, in various implementations, the image data includes, for each of a plurality of pixels representing a location in the physical environment, a color (or grayscale) value of the location representative of the amount and/or wavelength of light detected at the location and a depth value representative of a distance from the earpiece 200 to the location.

In various implementations, the earpiece 200 includes a microphone 250 coupled to the frame 201 and configured to generate ambient sound data indicative of sound in the physical environment. In various implementations, the earpiece 200 includes an inertial measurement unit (IMU) 260 coupled to the frame 201 and configured to determine movement and/or the orientation of the earpiece 200. In various implementations, the IMU 260 includes one or more accelerometers and/or one or more gyroscopes. In various implementations, the earpiece 200 includes a communications interface 270 coupled to frame configured to transmit and receive data from other devices. In various implementations, the communications interface 270 is a wireless communications interface.

The earpiece 200 includes, within the frame 201, one or more communication buses 204 for interconnecting the various components described above and/or additional components of the earpiece 200 which may be included.

In various implementations, the operating environment 20 includes a second earpiece 280 which may include any or all of the components of the earpiece 200. In various implementations, the frame 201 of the earpiece 200 is configured for insertion in one outer ear of a user and the frame of the second earpiece 280 is configured for insertion in another outer ear of the user, e.g., by being a mirror version of the frame 201.

In various implementations, the operating environment 20 includes a controller device 290. In various implementations, the controller device 290 is a smartphone, tablet, laptop, desktop, set-top box, smart television, digital media player, or smart watch. The controller device 290 includes one or more processors 291 coupled to memory 292, a display 293, and a communications interface 294 via one or more communication buses 214. In various implementations, the controller device 290 includes additional components such as any or all of the components described above with respect to the earpiece 200.

In various implementations, the display 293 is configured to display images based on display data provided by the one or more processors 291. In contrast, in various implementations, the earpiece 200 (and, similarly, the second earpiece 280) does not include a display or, at least, does not include a display within a field-of-view of the user when inserted into the outer ear of the user.

In various implementations, the one or more processors 210 of the earpiece 200 generates the audio data provided to the speaker 230 based on the image data received from the imaging system 240. In various implementations, the one or more processors 210 of the ear-mounted device transmits the image data via the communications interface 270 to the controller device 290, the one or more processors of the controller device 290 generates the audio data based on the image data, and the earpiece 200 receives the audio data via the communications interface 270. In either set of implementations, the audio data is based on the image data.

Figure 3:
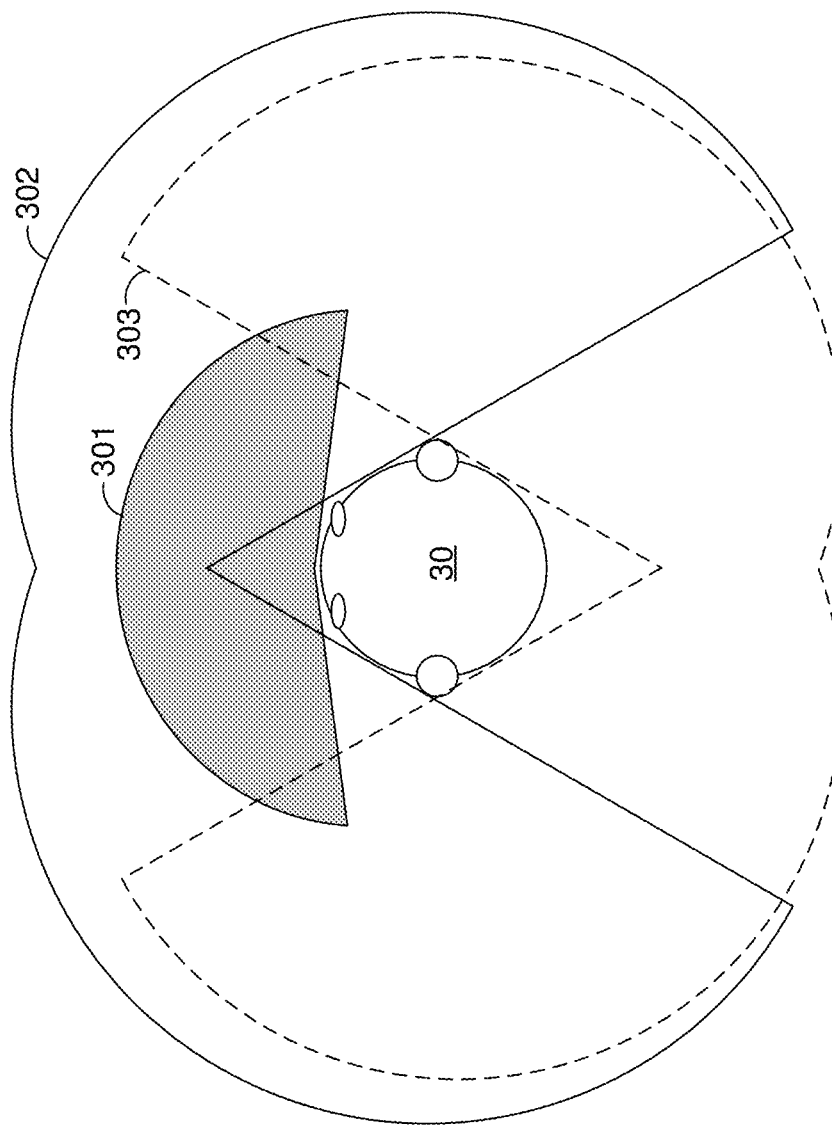
FIG. 3 illustrates various field-of-views in accordance with some implementations.

FIG. 3 illustrates various field-of-views in accordance with some implementations. A user field-of-view 301 of a user 30 typically extends approximately 300 degrees with varying degrees of visual perception within that range. For example, excluding far peripheral vision, the user field-of-view 301 is only approximately 120 degrees, and the user field-of-view 301 including only foveal vision (or central vision) is only approximately 5 degrees.

In contrast, a system (head-mounted device 150 of FIG. 1) may have a device field-of-view that includes views outside the user field-of-view 301 of the user 30. For example, a system may include a forward-and-outward-facing camera including a fisheye lens with a field-of-view of 180 degrees proximate to each ear of the user 30 and may have a device forward field-of-view 302 of approximately 300 degrees. Further, a system may further include a rearward-and-outward-facing camera including a fisheye lens with a field-of-view of 180 degrees proximate to each ear of the user 30 and may also have a device rearward field-of-view 303 of approximately 300 degrees. In various implementations, a system including multiple cameras proximate to each ear of the user can have a device field-of-view of a full 360 degrees (e.g., including the device forward field-of-view 302 and the device rearward field-of-view 303). It is to be appreciated that, in various implementations, the cameras (or combination of cameras) may have smaller or larger fields-of-view than the examples above.

The systems described above can perform a wide variety of functions. For example, in various implementations, while playing audio (e.g., music or an audiobook) via the speaker, in response to detecting a particular hand gesture (even a hand gesture performed outside a user field-of-view) in images captured by the imaging system, the system may alter playback of the audio (e.g., by pausing or changing the volume of the audio). For example, in various implementations, in response to detecting a hand gesture performed by a user proximate to the user's ear of closing an open hand into a clenched first, the system pauses the playback of audio via the speaker.

As another example, in various implementations, while playing audio via the speaker, in response to detecting a person attempting to engage the user in conversation or otherwise talk to the user (even if the person is outside the user field-of-view) in images captured by the imaging system, the system may alter playback of the audio. For example, in various implementations, in response to detecting a person behind the user attempting to talk to the user, the system reduces the volume of the audio being played via the speaker and ceases performing an active noise cancellation algorithm.

As another example, in various implementations, in response to detecting an object or event of interest in the physical environment in images captured by the imaging system, the system generates an audio notification. For example, in various implementations, in response to detecting a person in the user's periphery or outside the user field-of-view attempting to get the user's attention (e.g., by waving the person's arms), the device plays, via the speaker, an alert notification (e.g., a sound approximating a person saying "Hey!"). In various implementations, the system plays, via two or more speakers, the alert notification spatially such that the user perceives the alert notification as coming from the direction of the detected object.

As another example, in various implementations, in response to detecting an object or event of interest in the physical environment in images captured by the imaging system, the system stores, in the memory, an indication that the particular object was detected (which may be determined using images from the imaging system) in association with a location at which the object was detected (which may also be determined using images from the imaging system) and a time at which the object was detected. In response to a user query (e.g., a vocal query detected via the microphone), the system provides an audio response. For example, in response to detecting a water bottle in an office of the user, the system stores an indication that the water bottle was detected in the office and, in response to a user query at a later time of "Where is my water bottle?", the device may generate audio approximating a person saying "In your office."

As another example, in various implementations, in response to detecting an object in the physical environment approaching the user in images captured by the imaging system, the system generates an audio notification. For example, in various implementations, in response to detecting a car approaching the user at a speed exceeding a threshold, the system plays, via the speaker, an alert notification (e.g., a sound approximating the beep of a car horn). In various implementations, the system plays, via two or more speakers, the alert notification spatially such that the user perceives the alert notification as coming from the direction of the detected object.

As another example, in various implementations, in response to detecting a hand gesture indicating an actionable item, the system performs an action associated with the actionable item. For example, in various implementations, in response to detecting a user swiping across a phone number, the system calls the phone number.

Figure 4A:
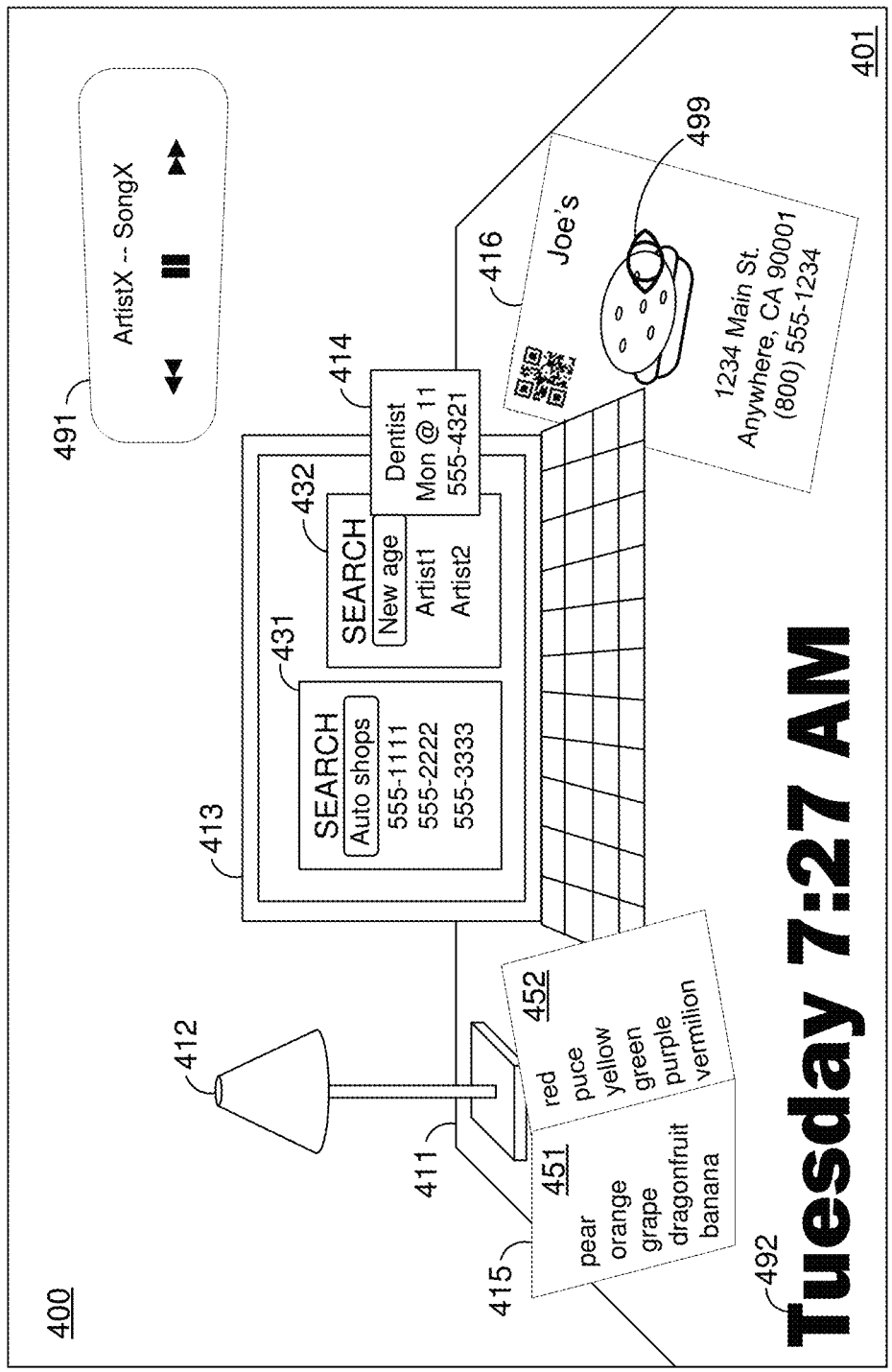
FIGS. 4A-4C illustrate an XR environment during various time periods in accordance with some implementations.
Figure 4B:
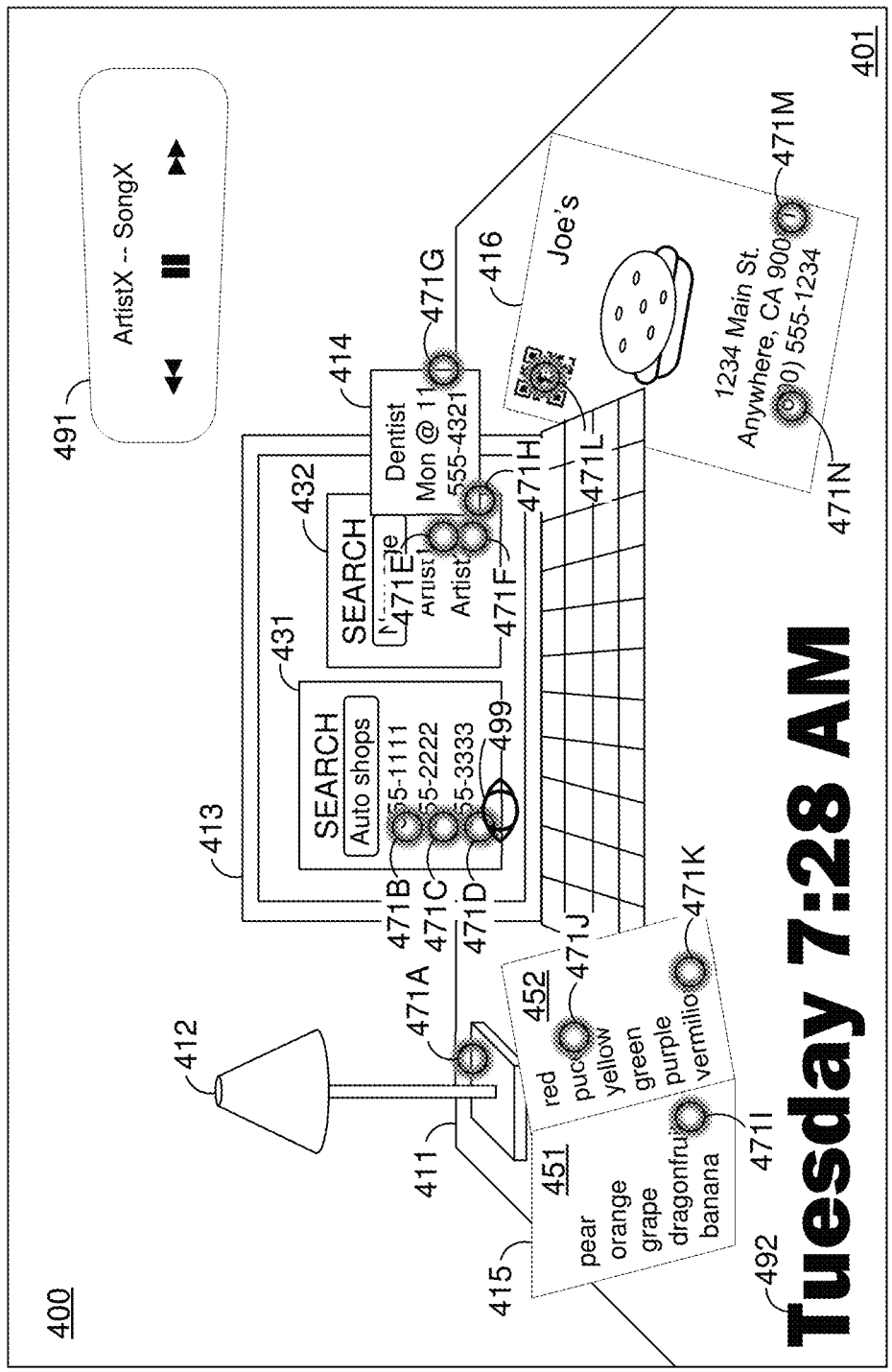
Figure 4C:
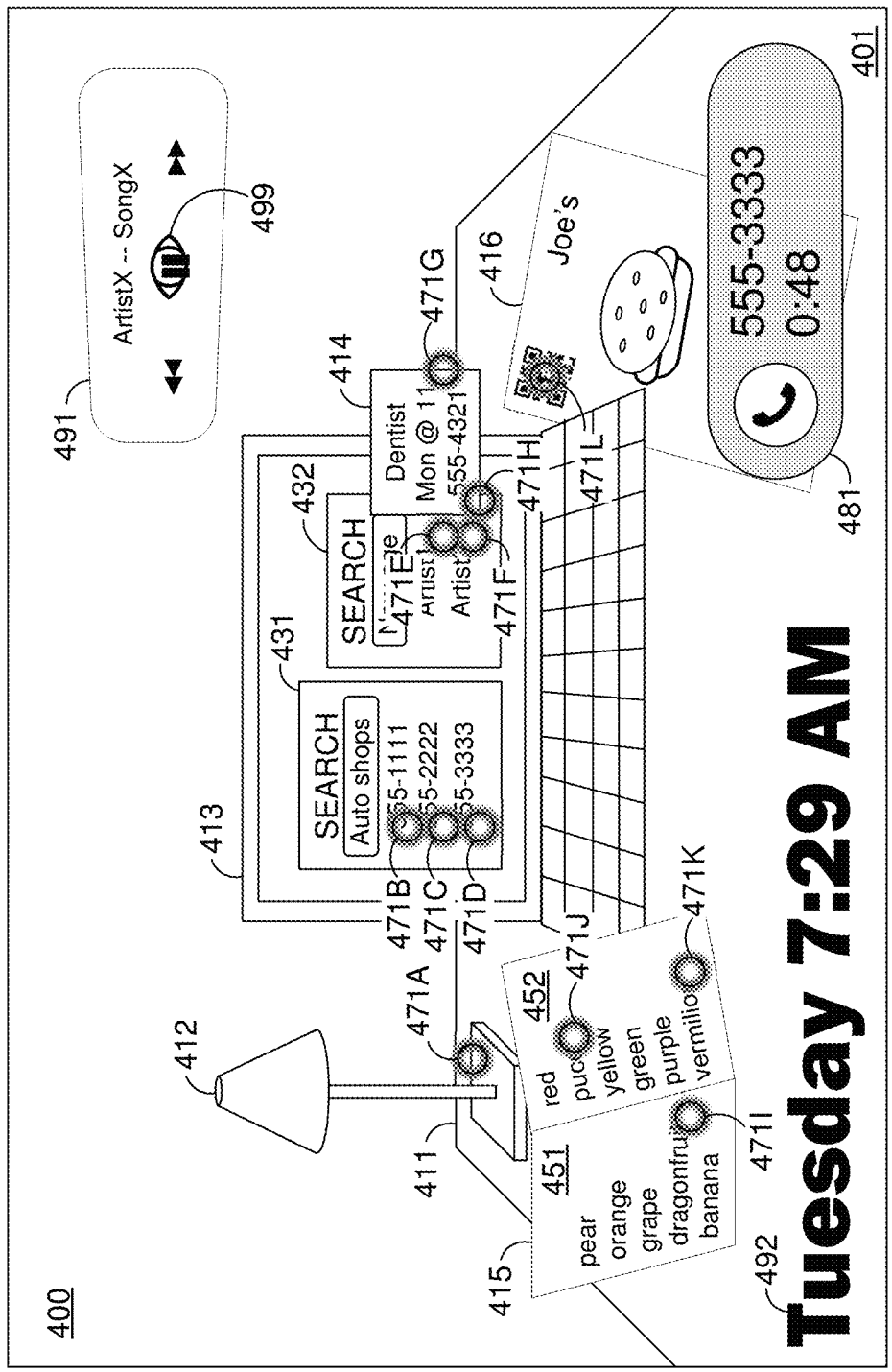

FIGS. 4A-4C illustrate an XR environment 400 presented, at least in part, by a display of an electronic device, such as the head-mounted device 150 of FIG. 1. The XR environment 400 is based on a physical environment 401 of an office in which the electronic device is present. FIGS. 4A-4C illustrate the XR environment 400 during a series of time periods in various implementations. In various implementations, each time period is an instant, a fraction of a second, a few seconds, a few hours, a few days, or any length of time.

FIGS. 4A-4C illustrate a gaze location indicator 499 that indicates a gaze location of the user, e.g., where in the XR environment 400 the user is looking. Although the gaze location indicator 499 is illustrated in FIGS. 4A-4C, in various implementations, the gaze location indicator is not displayed by the electronic device.

FIG. 4A illustrates the XR environment 400 during a first time period. The XR environment 400 includes a plurality of objects, including one or more physical objects (e.g., a desk 411, a lamp 412, a laptop 413, a sticky note 414, a book 415, and a takeout menu 416) of the physical environment 401 and one or more virtual objects (e.g., a virtual media player window 491 and a virtual clock 492). In various implementations, certain objects (such as the physical objects and the virtual media player window 491) are presented at a location in the XR environment 400, e.g., at a location defined by three coordinates in a common three-dimensional (3D) XR coordinate system such that while some objects may exist in the physical world and others may not, a spatial relationship (e.g., distance or orientation) may be defined between them.

Accordingly, when the electronic device moves in the XR environment 400 (e.g., changes either position and/or orientation), the objects are moved on the display of the electronic device, but retain their location in the XR environment 400. Such virtual objects that, in response to motion of the electronic device, move on the display, but retain their position in the XR environment 400 are referred to as world-locked objects. In various implementations, certain virtual objects (such as the virtual clock 492) are displayed at locations on the display such that when the electronic device moves in the XR environment 400, the objects are stationary on the display on the electronic device. Such virtual objects that, in response to motion of the electronic device, retain their location on the display are referred to as display-locked objects.

In the XR environment 400 (as in the physical environment 401), the lamp 412, the laptop 413, the book 415, and the takeout menu 416 sit atop the desk 411. Further, the sticky note 414 is attached to the laptop 413. The laptop 413 displays a first window 431 including search results for local automobile repair shops, including a phone number of a first auto shop, a phone number of a second auto shop, and a phone number of a third auto shop. The laptop 413 further displays a second window 432 including search results for artists of New Age music, including a name of a first artist and a name of a second artist.

The sticky note 414 has written thereon a reminder of a dentist's appointment including a time-and-date and a phone number of a dentist. The book 415 includes a first page 451 including a list of fruits and second page 452 including a list of colors. The takeout menu 416 includes an address of a restaurant, a phone number of the restaurant, and a QR code encoding the URL of a webpage of the restaurant.

The virtual media player window 491 indicates that the electronic device is playing a song entitled "SongX" by an artist named "ArtistX". The virtual clock 492 indicates a current day and time.

During the first time period, as indicated by the gaze location indicator 499 the user is looking at the takeout menu 416.

During the first time period, the electronic device scans the physical environment 401, e.g., by processing an image of physical environment 401, to extract information from the physical environment 401. In various implementations, extracting information from the physical environment 401 includes detecting one or more actionable items, e.g., objects and/or information associated with respective actions using, e.g., computer-vision techniques such as using a model trained to detect and classify various objects or detect and interpret machine-readable content. For example, using object recognition, the electronic device detects the lamp 412 which is associated with an action of turning the lamp on or off. As another example, using text recognition, in the first window 431 displayed by the laptop 413, the electronic device detects the phone number of the first auto shop which is associated with an action of calling the phone number of the first auto shop and/or an action of saving the phone number of the first auto shop as a contact.

FIG. 4B illustrates the XR environment 400 during a second time period subsequent to the first time period. In FIG. 4B, in response to detecting a plurality of actionable items associated with plurality of respective actions, the XR environment 400 includes a respective plurality of glints 471A-471N. Each of the plurality of glints 471A-471N indicates the detection of an actionable item in the physical environment 401.

A glint is a user interface element. In various implementations, performing the respective action includes displaying the glint. For example, in various implementations, the respective action includes displaying information associated with the actionable item and the glint includes the information. In various implementations, a glint is an affordance which, when selected, performs the respective action of the actionable item or, at least, displays an action affordance for performing the respective action. In various implementations, a glint is a world-locked virtual object presented in association with its respective actionable item. For example, in various implementations, a glint is a small glowing circle presented at a location in the XR environment 400 proximate to the location of a detected actionable item.

In FIG. 4B, in response to detecting the lamp 412 which is associated with an action of turning the lamp on or off, the XR environment 400 includes a first glint 471A. In response to detecting, in the first window 431 displayed by the laptop 413, the phone number of the first auto shop associated with an action of calling the phone number of the first auto shop, the XR environment 400 includes a second glint 471B. In response to detecting, in the first window 431 displayed by the laptop 413, the phone number of the second auto shop associated with an action of calling the phone number of the second auto shop, the XR environment 400 includes a third glint 471C. In response to detecting, in the first window 431 displayed by the laptop 413, the phone number of the third auto shop associated with an action of calling the phone number of the third auto shop, the XR environment 400 includes a fourth glint 471D.

In response to detecting, in the second window 432 displayed by the laptop 413, the name of the first artist associated with an action of playing music by the first artist, the XR environment 400 includes a fifth glint 471E. In response to detecting, in the second window 432 displayed by the laptop 413, the name of the second artist associated with an action of playing music by the second artist, the XR environment 400 includes a sixth glint 471F.

In response to detecting, on the sticky note 414, the time-and-date associated with an action of generating a calendar event for that time-and-date in a calendar application, the XR environment 400 includes a seventh glint 471G. In response to detecting, on the sticky note 414, the phone number of the dentist associated with an action of calling the phone number of the dentist, the XR environment 400 includes an eighth glint 471H.

In response to detecting, on the first page 451 of the book 415, the uncommon word "dragonfruit" associated with an action of displaying a dictionary definition or encyclopedia entry of the word, the XR environment 400 includes a ninth glint 471I. In response to detecting, on the second page 451 of the book 415, the uncommon word "puce" associated with an action of displaying a dictionary definition or encyclopedia entry of the word, the XR environment 400 includes a tenth glint 471I. In response to detecting, on the second page 452 of the book 415, the uncommon word "vermilion" associated with an action of displaying a dictionary definition or encyclopedia entry of the word, the XR environment 400 includes an eleventh glint 471K.

In response to detecting, on the takeout menu 416, the QR code associated with an action of opening the webpage having the URL encoded by the QR code, the XR environment 400 includes a twelfth glint 471L. In response to detecting, on the takeout menu 416, the address of the restaurant associated with an action of displaying a map of the address and/or directions to the address in a map application, the XR environment 400 includes a thirteenth glint 471M. In response to detecting, on the takeout menu 416, the phone number of the restaurant associated with an action of calling the phone number of the restaurant, the XR environment 400 includes a fourteenth glint 471N.

In various implementations, the respective action includes displaying information associated with the respective actionable item. For example, in various implementations, the action associated with the uncommon word "dragonfruit" is displaying a dictionary definition of the word. In various implementations, the associated glint (e.g., the ninth glint 471I) is not an affordance for displaying the dictionary definition, but is a user interface element that includes the dictionary definition. Thus, in various implementations, performing the action associated with the actionable item includes displaying the glint. In various implementations, the glint including the dictionary definition is not an affordance for performing a further action. In various implementations, the glint including the dictionary definition is affordance for displaying an encyclopedia entry of the word.

In various implementations, different glints are generated by different applications executed by the electronic device. For example, in various implementations, the first glint 471A associated with the lamp is generated by a smart home application. As another example, in various implementations, the ninth glint 471I, tenth glint 471J, and eleventh glint 471K associated with the book 415 are generated by a dictionary application. As another example, the fifth glint 471E and sixth glint 471F are generated by a music application.

In various implementations, different glints associated with different types of actions (e.g., generated by different applications) are displayed differently. In various implementations, the different glints are displayed with a different size, shape, or color. For example, in various implementations, the first glint 471A associated with the action of controlling a smart home device is displayed with a first color and the second glint 471B, third glint 471C, fourth glint 471D, eighth glint 471F, and fourteenth glint 471N each associated with calling a phone number are displayed with a second color.

In various implementations, different glints associated with different types of actions are displayed in association with their respective actionable items in different ways. For example, in various implementations, the ninth glint 471I, tenth glint 471J, and eleventh glint 471K each associated with the action of displaying a dictionary definition or encyclopedia entry of an uncommon word are displayed at the end of their respective words, allowing a user to read the entire word before deciding whether to select the glint to receive additional information. As another example in contrast, in various implementations, the second glint 471B, third glint 471C, fourth glint 471D, eighth glint 471F, and fourteenth glint 471N each associated with calling a phone number are displayed at the beginning of the respective phone number to obscure less informative information, such as an area code which may be common to many phone numbers in the field-of-view. As another example, in various implementations, the twelfth glint 471L associated with the action of opening a webpage having a URL encoded by a QR code is displayed centrally over the QR code so as to obscure human-unreadable information while minimizing obscuration of any other part of the field-of-view.

As noted above, in FIG. 4B, each of the plurality of glints 471A-471N is a user interface element which, when selected, performs the respective action of the actionable item or, at least, provides the user the option to perform the respective action. In various implementations, a user selects the glint by performing a hand gesture (e.g., a pinch-and-release gesture) at the location of the glint. In various implementations, the user selects the glint by looking at the glint and performing a head gesture, such as a nod, a wink, a blink, or an eye swipe (in which the gaze of the user swipes across the glint). In various implementations, the user selects the glint by looking at the glint and performing a hand gesture. In various implementations, the user selects the glint by looking at the glint and performing a vocal gesture (e.g., saying "open"). In various implementations, while a user is looking at a glint, the glint is displayed differently, e.g., bigger or brighter, to indicate that the user is looking at the glint.

During the second time period, the user selects the fourth glint 471D. Accordingly, the gaze location indicator 499 indicates that the user is looking at the fourth glint 471D.

FIG. 4C illustrates the XR environment 400 during a third time period subsequent to the second time period. In response to detecting selection of the fourth glint 471D, the electronic device performs the action associated with the fourth glint 471D, e.g., calling the phone number of the third auto shop. Accordingly, in FIG. 4C, the XR environment 400 includes an active call indicator 481 indicating that the user is engaged in a telephone call with the phone number of the third auto shop and has been for 48 seconds. In various implementations, the active call indicator 481 is a display-locked virtual object.

In various implementations, a device may not include a display on which to display glints associated with actionable items. For example, in various implementations, the head-mounted device 150 of FIG. 1 and/or the earpiece 200 of FIG. 2 does not include a display. However, such a device may include components for detecting actionable items in the physical environment (e.g., the imaging system 240 of FIG. 2) and components performing actions associated with the actionable items (e.g., a communications interface 270 of FIG. 2 to turn the lamp 412 on or off and/or the communications interface 270, the microphone 250, and the speaker 230 of FIG. 2 for calling a telephone number). Further, the device may include components for detecting with which actionable item of the plurality of actionable items in the physical environment 401 the wishes to engage. For example, the earpiece 200 of FIG. 2 includes the imaging system 240 which can detect a hand gesture indicating a particular actionable item.

Accordingly, in various implementations, the device detects a hand gesture indicating an actionable item in the physical environment 401 and, in response, performs an action associated with the actionable item. In various implementations, the device does not include a display. In various implementations, the device includes a display, but does not display a glint in association with the actionable item.

FIGS. 5A-5I illustrate the physical environment 401 during a series of time periods in various implementations. In various implementations, each time period is an instant, a fraction of a second, a few seconds, a few hours, a few days, or any length of time. FIGS. 5A-5I illustrate a right hand 599 of a user. To better illustrate interaction of the right hand 599 with actionable items in the physical environment 401, the right hand 599 is illustrated as transparent.

Figure 5A:
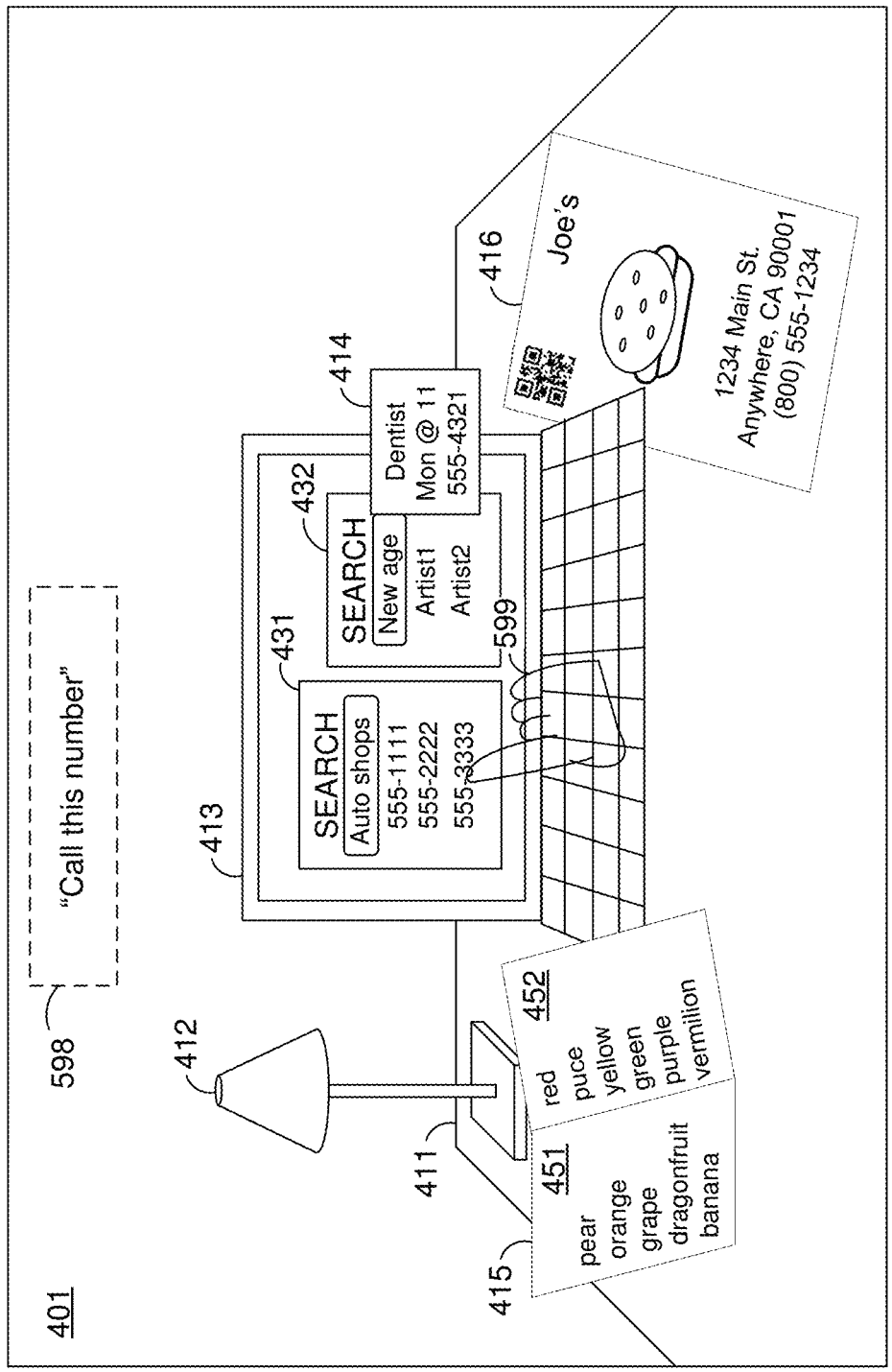
FIGS. 5A-5I illustrate a physical environment during various time periods in accordance with some implementations.

FIG. 5A illustrates the physical environment 401 during a first time period. During the first time period, the right hand of the user 599 performs a pointing hand gesture indicating the phone number of the third auto shop. During the first time period, the user speaks a vocal command to initiate a telephone call with the indicated phone number, e.g., "Call this number".

FIG. 5A illustrates a user speech indicator 598 indicating that the user has spoken the vocal command to "Call this number." In various implementations, the device does not include a display and, accordingly, the user speech indicator 598 is not displayed. In various implementations, the device includes a display and the user speech indicator 598 is not displayed. In various implementations, the device includes a display and the user speech indicator 598 is displayed as a display-locked virtual object.

In response to detecting the hand gesture indicating the phone number of the third auto shop and the vocal command to initiate a telephone call with the indicated phone number, the device initiates a phone call with the phone number of the third auto shop. In various implementations, the device includes a display and displays an active call indicator 481 as illustrated in FIG. 4C.

A hand gesture can indicate an actionable item in various ways. In various implementations, the hand gesture is a static hand gesture indicating a location of the actionable item. For example, in FIG. 5A, the hand gesture is a pointing hand gesture in which the index finger is extended to terminate or point at the location of the actionable item and, in various implementations, the other digits of the hand are contracted. As another example, in various implementations, the hand gesture is a circle hand gesture in which one finger contacts the thumb to form a circle at the location and, in various implementations, the other digits of the hand are extended (e.g., an OK hand gesture) or parallel to the index finger (e.g., a zero hand gesture). In various implementations, the hand gesture is a dynamic hand gesture indicating a location of the actionable item. For example, in various implementations, the hand gesture is a tap hand gesture in which a finger moves towards the location of the actionable item. As another example, in various implementations, the hand gesture is a double-tap hand gesture in which a finger moves towards, then away from, then again towards the location of the action item. As another example, in various implementations, the hand gesture is a swipe hand gesture in which one finger moves across (or below) the location of the actionable item. As another example, in various implementations, the hand gesture is a circling hand gesture in which one finger moves around the location of the actionable item.

Figure 5B:
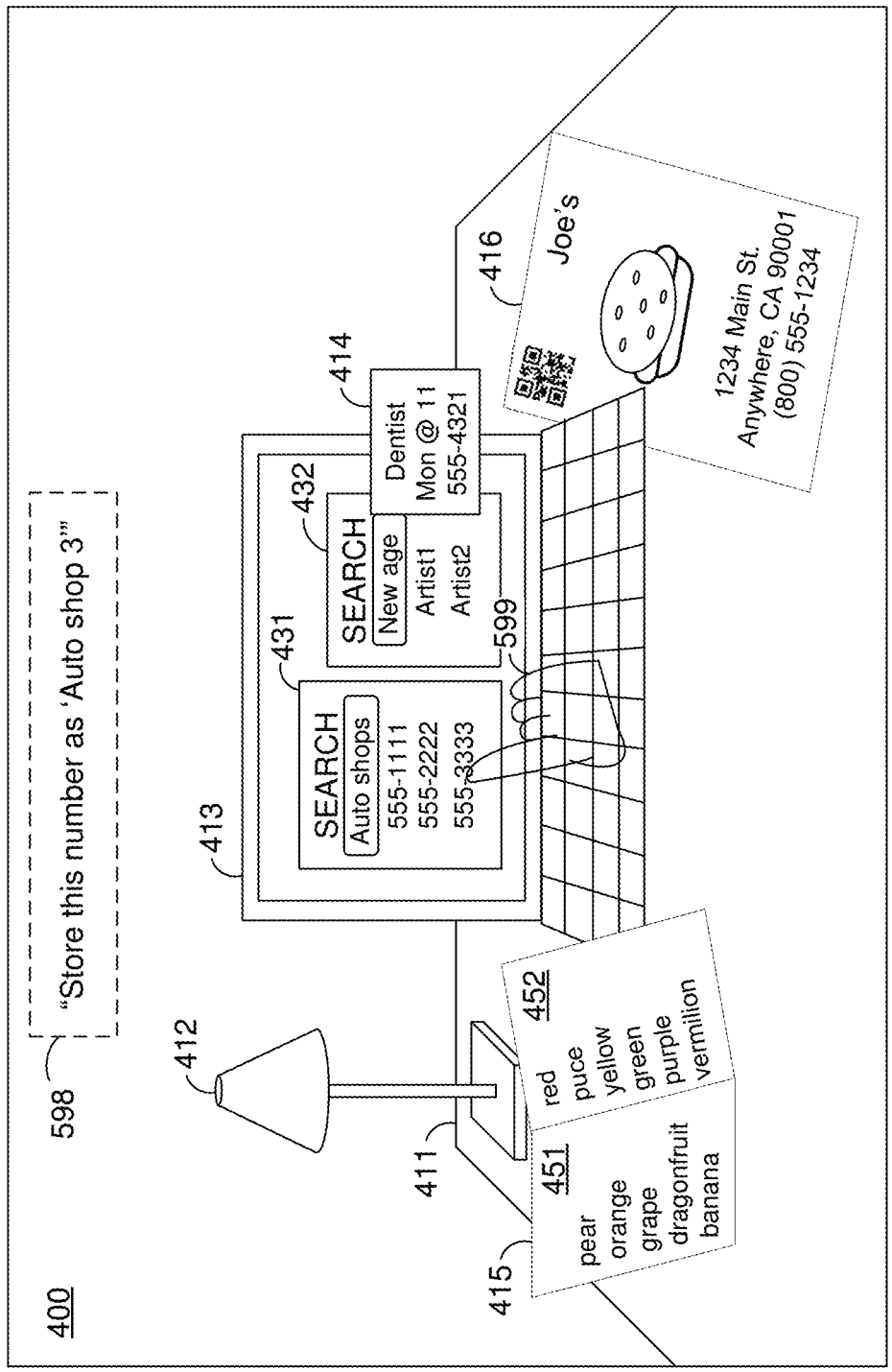

FIG. 5B illustrates the physical environment 401 during a second time period subsequent to the first time period. During the second time period, the right hand of the user 599 performs a pointing hand gesture indicating the phone number of the third auto shop. During the second time period, the user speaks a vocal command to store the indicated phone number as a contact with a particular name, e.g., "Store this number as 'Auto shop 3'."

In response to detecting the hand gesture indicating the phone number of the third auto shop and the vocal command to store the indicated phone number, the device stores the phone number of the third auto shop as a contact named 'Auto shop 3'.

Figure 5C:
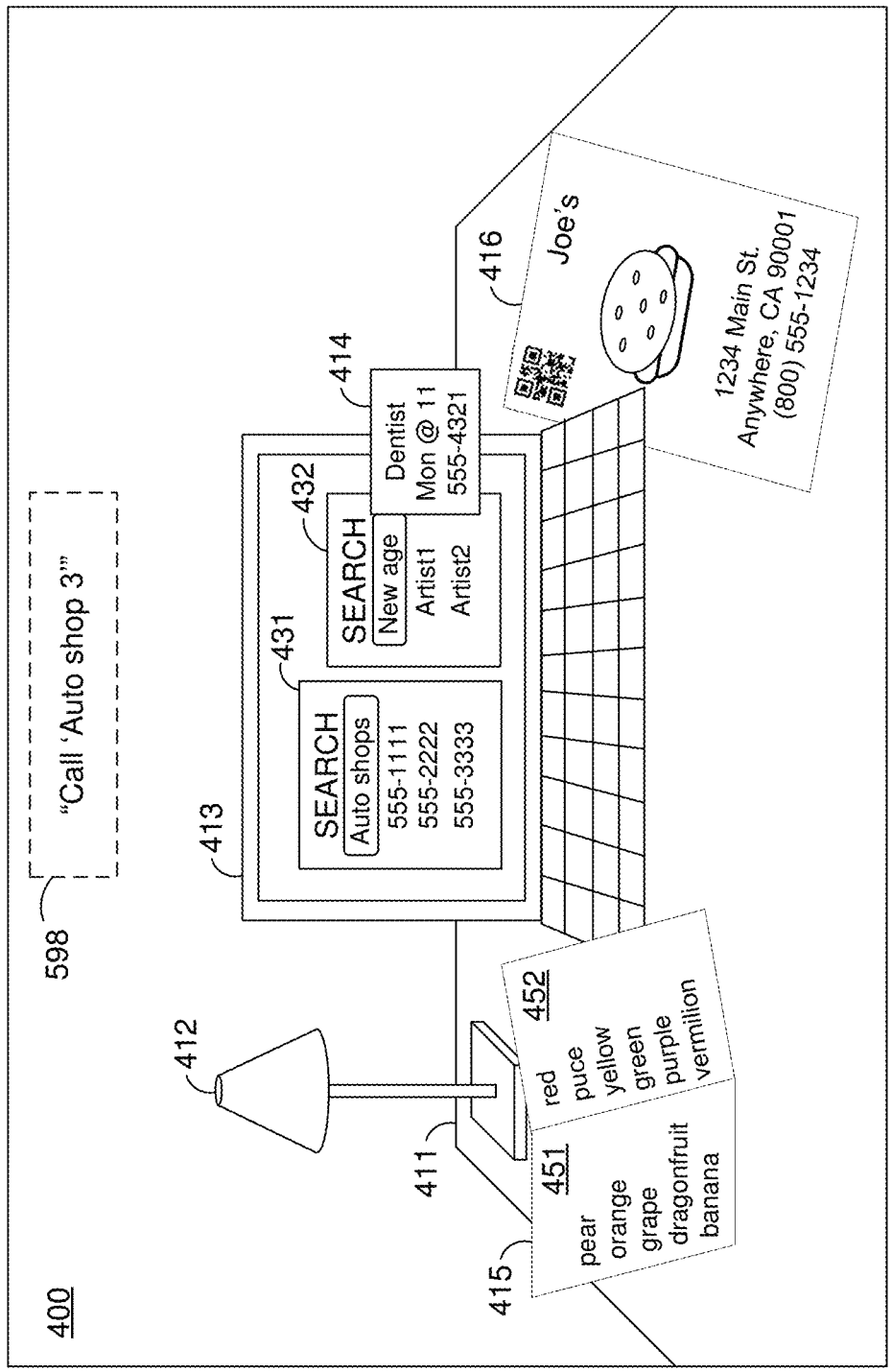

FIG. 5C illustrates the physical environment 401 during a third time period subsequent to the second time period. During the third time period, the user speaks a vocal command to initiate a telephone call with the contact named 'Auto shop 3', e.g., "Call 'Auto shop 3'."

In response to detecting the vocal command to initiate a telephone call with the contact named 'Auto shop 3', the device initiates a phone call with the phone number of the third auto shop. In various implementations, the device includes a display and displays an active call indicator 481 as illustrated in FIG. 4C.

Figure 5D:
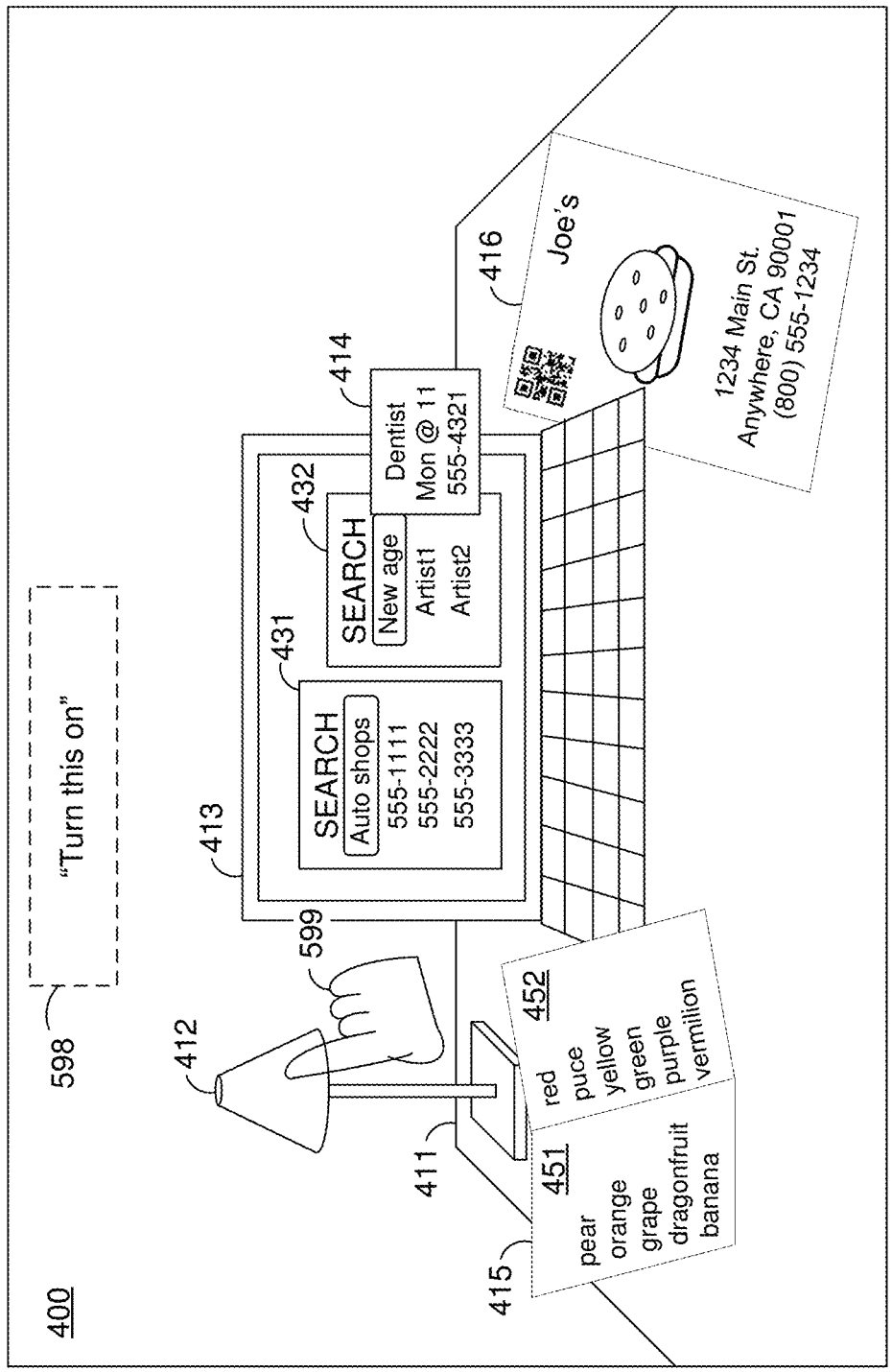

FIG. 5D illustrates the physical environment 401 during a fourth time period subsequent to the third time period. During the fourth time period, the right hand of the user 599 performs a pointing hand gesture indicating the lamp 412. During the fourth time period, the user speaks a vocal command to change a state of the indicated object, e.g., "Turn this on."

In response to detecting the hand gesture indicating the lamp 412 and the vocal command to change a state of the indicate object, the device turns the lamp 412 on.

Figure 5E:
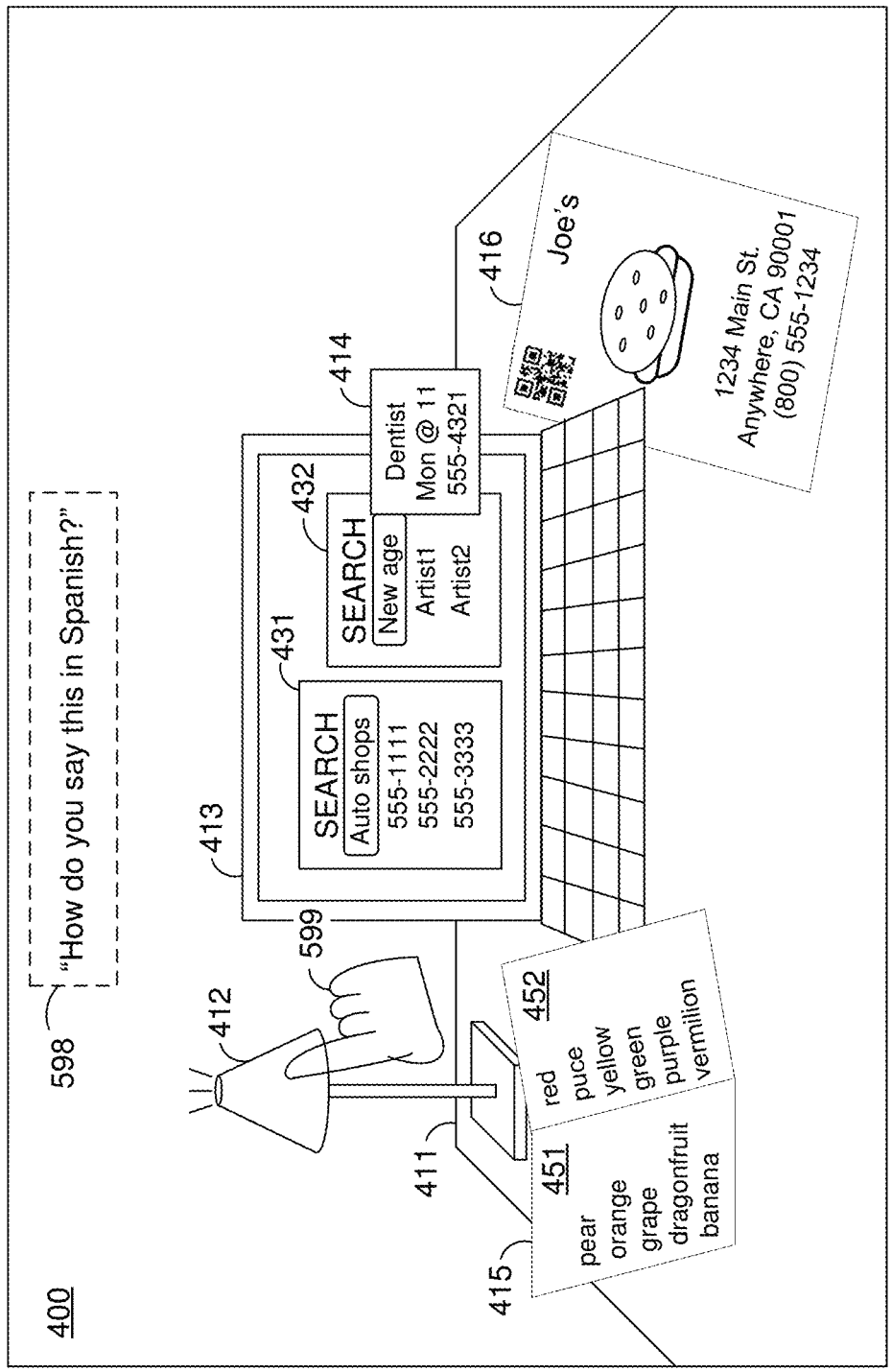

FIG. 5E illustrates the physical environment 401 during a fifth time period subsequent to the fourth time period. During the fifth time period, the lamp 412 is turned on in response to the hand gesture and vocal command detected during the fourth time period. During the fifth time period, the right hand of the user 599 performs a pointing hand gesture indicating the lamp 412. During the fifth time period, the user speaks a vocal command to play audio of a translation of an object type of the indicated object, e.g., "How do you say this in Spanish?"

In response to detecting the hand gesture indicating the lamp 412 and the vocal command to play audio of a translation of an object type of the indicated object, the device plays audio corresponding a translation of the word "lamp".

Figure 5F:
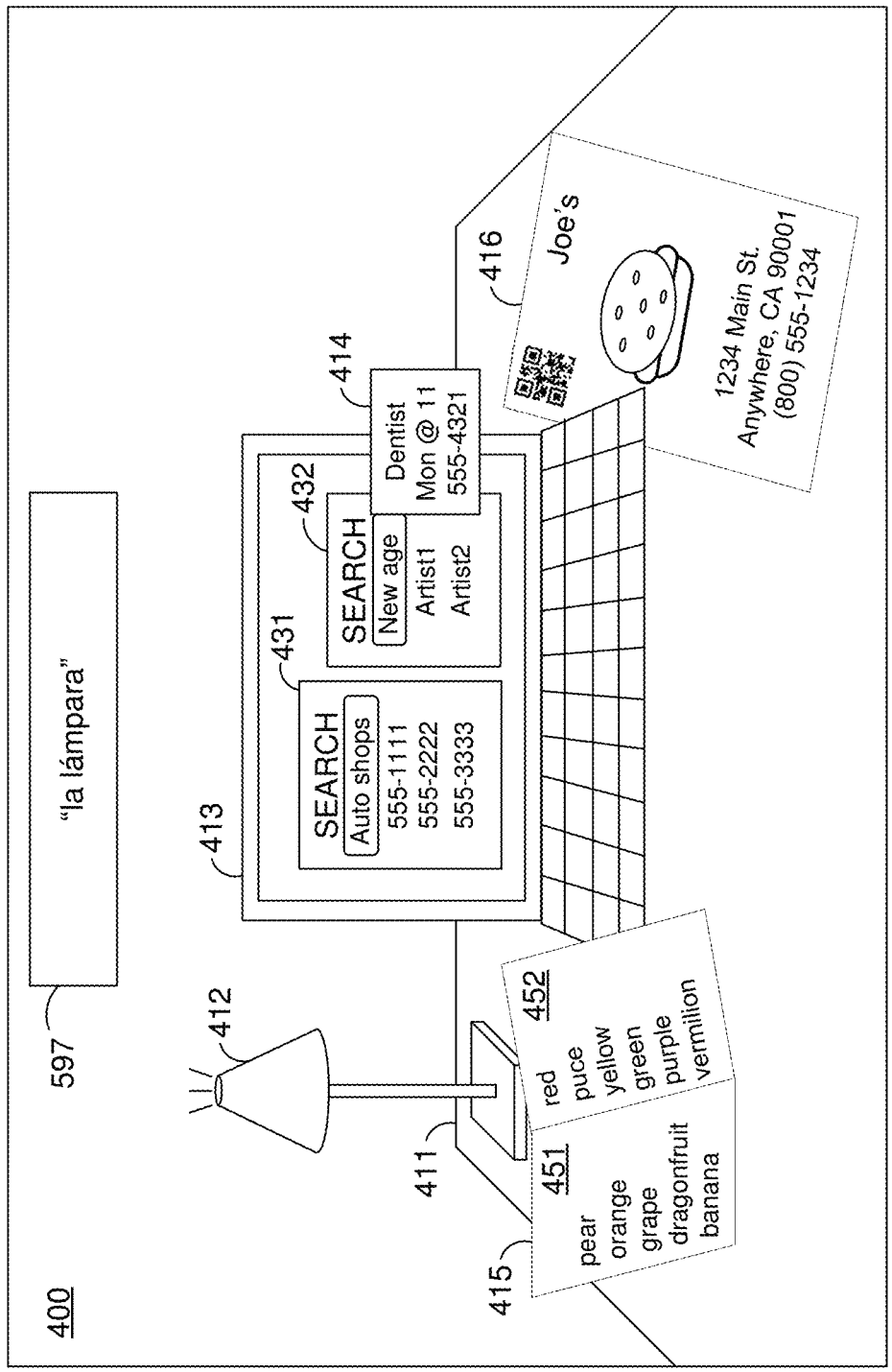

FIG. 5F illustrates the physical environment 401 during a sixth time period subsequent to the fifth time period. During the sixth time period, in response to the hand gesture and vocal command detected during the fifth time period, the device plays audio corresponding to a translation of the word "lamp", e.g., "la lámpara".

FIG. 5F illustrates a device audio indicator 597 indicating that the device has played audio corresponding to the words "la lámpara". In various implementations, the device does not include a display and, accordingly, the device audio indicator 597 is not displayed. In various implementations, the device includes a display and the device audio indicator 597 is not displayed. In various implementations, the device includes a display and the device audio indicator 597 is displayed as a display-locked virtual object.

Figure 5G:
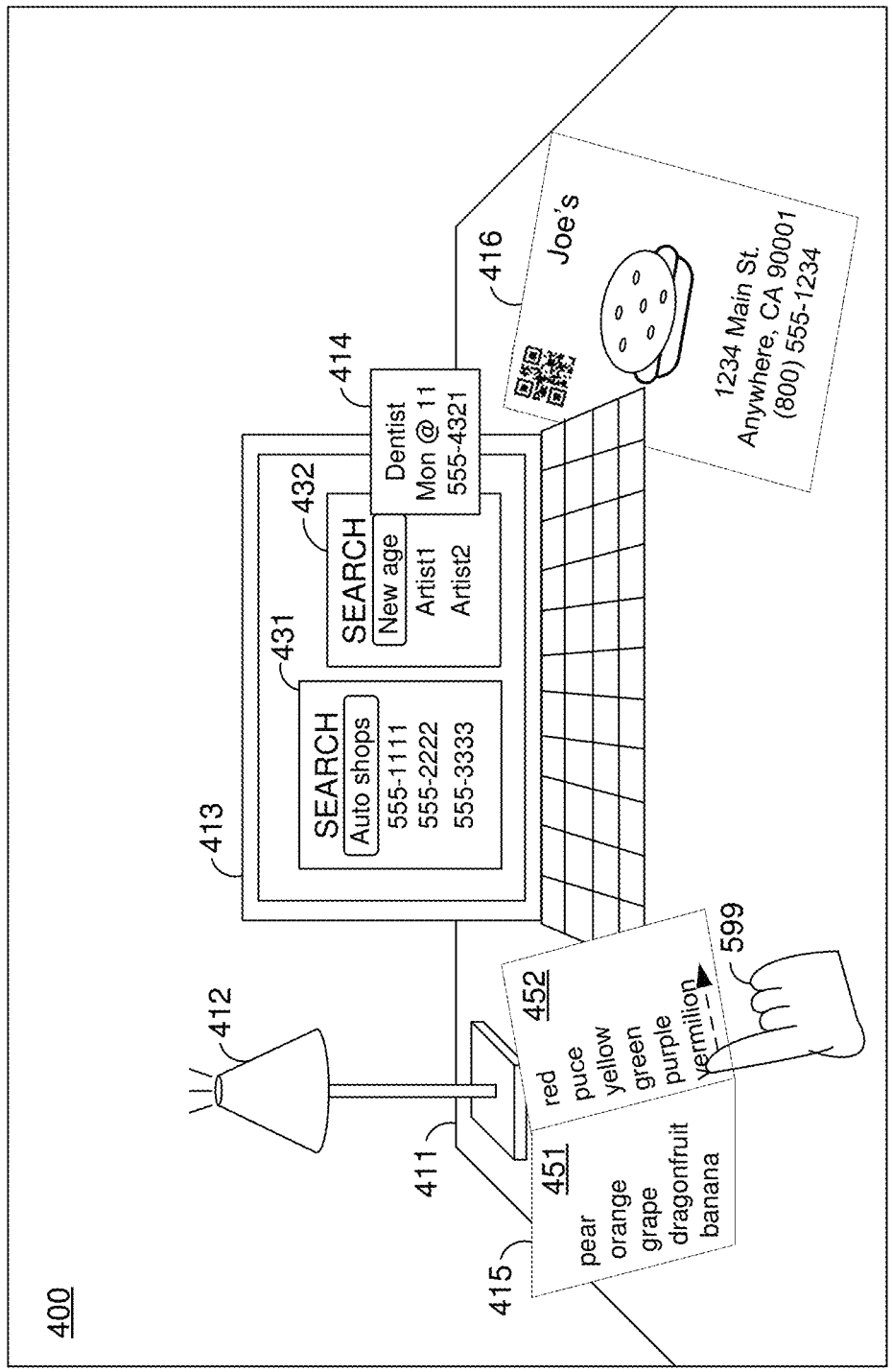

FIG. 5G illustrates the physical environment 401 during a seventh time period subsequent to the sixth time period. During the seventh time period, the right hand of the user 599 performs a swipe hand gesture indicating the word "vermilion" on the second page 452 of the book 415. In response to detecting the swipe hand gesture indicating the word "vermilion", the device plays audio corresponding the indicated word, e.g., the device reads the word "vermilion".

Figure 5H:
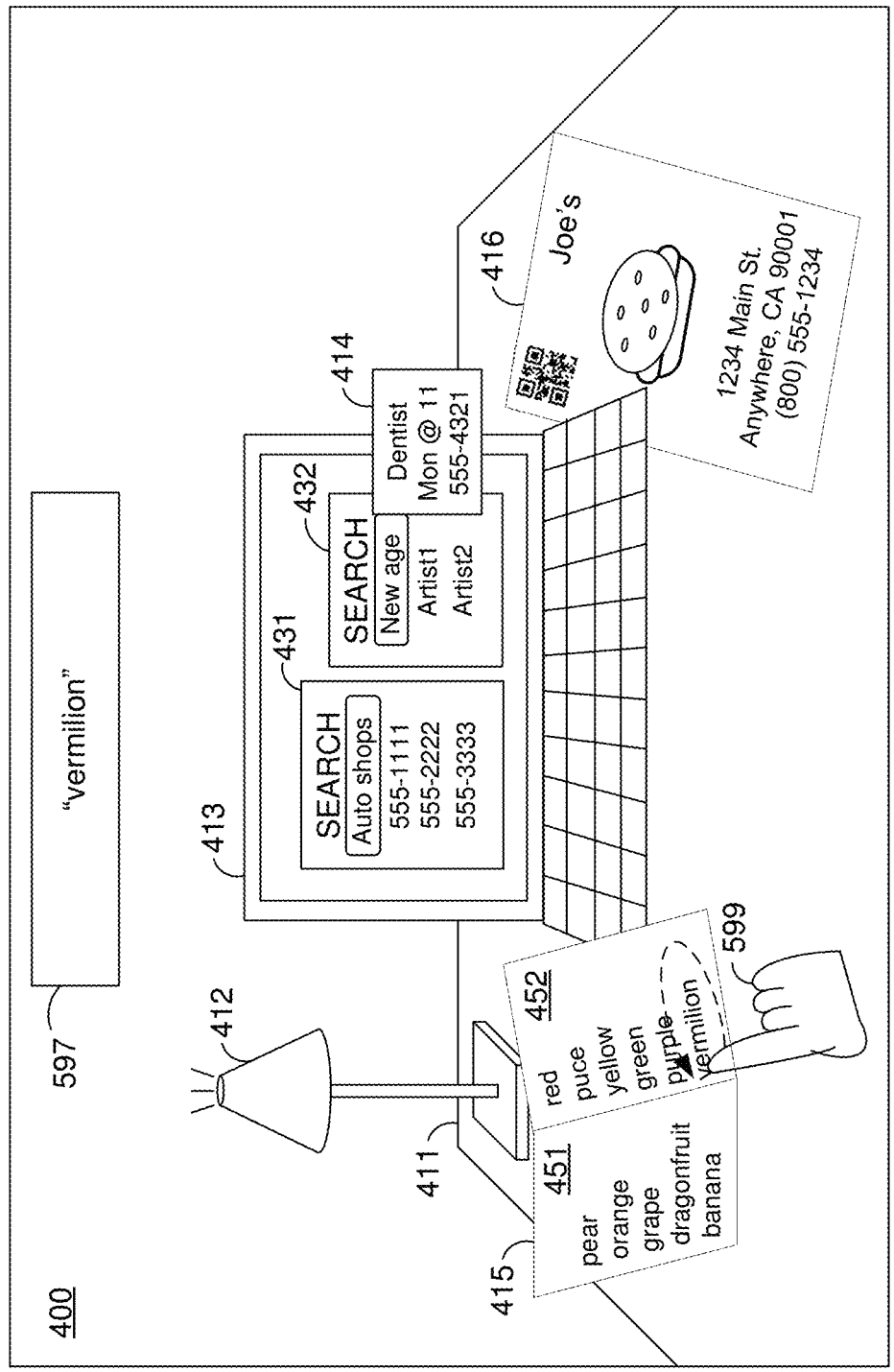

FIG. 5H illustrates the physical environment 401 during an eighth time period subsequent to the seventh time period. During the eighth time period, in response to the swipe hand gesture and as indicated by the device audio indicator 597, the device plays audio corresponding to word "vermilion". During the eighth time period, the right hand of the user 599 performs a circling hand gesture indicating the word "vermilion" on the second page 452 of the book 415. In response to detecting the circling hand gesture indicating the word "vermilion", the device plays audio corresponding to a definition of the indicated word, e.g., "a bright red color".

Figure 5I:
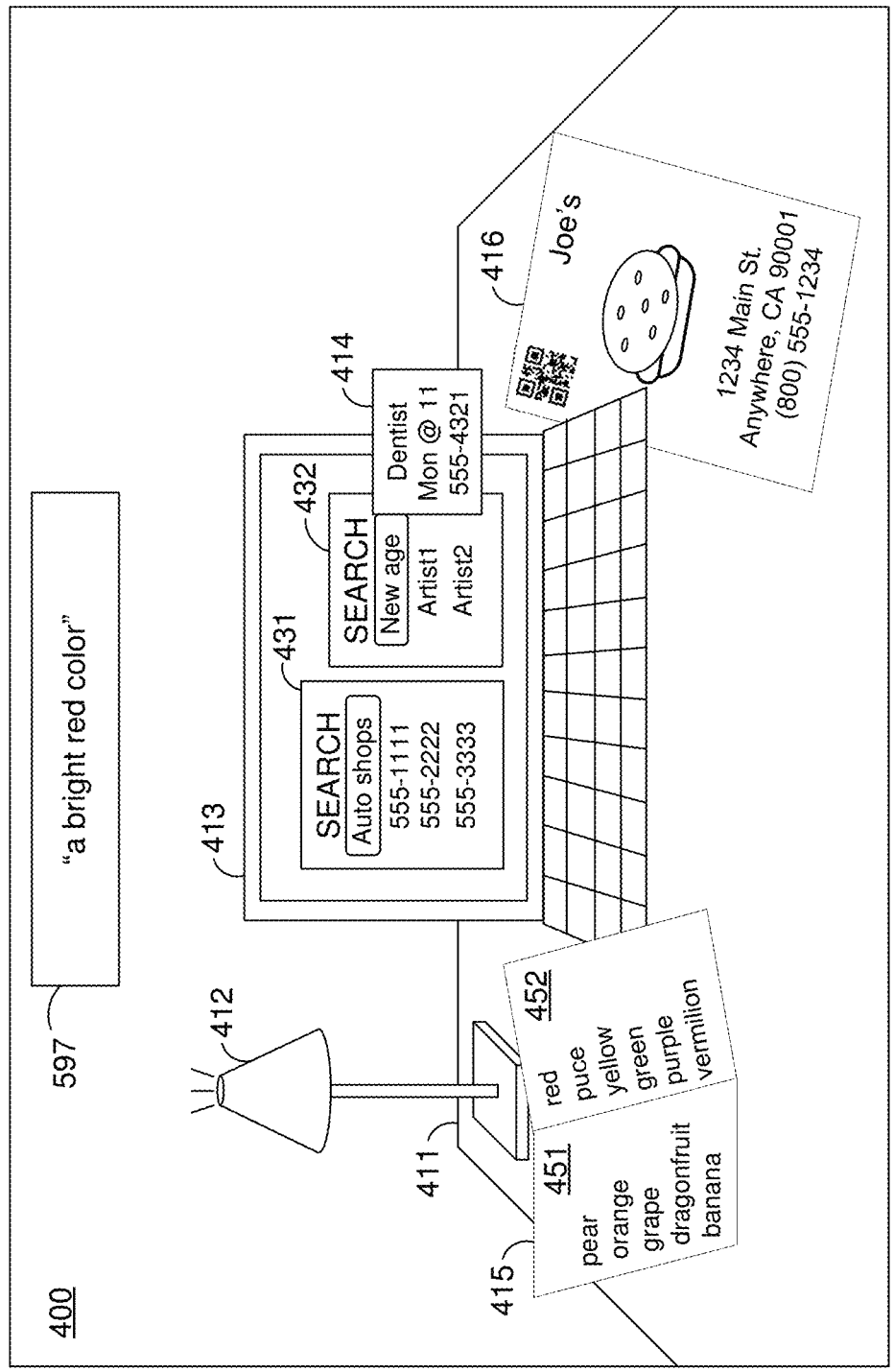

FIG. 5I illustrates the physical environment 401 during a ninth time period subsequent to the eighth time period. During the ninth time period, in response to the circling hand gesture and as indicated by the device audio indicator 597, the device plays audio corresponding to a definition of the word "vermilion", e.g., "a bright red color".

In various implementations, such as those shown in FIGS. 5A-5F, the device performs an action (e.g., initiating a phone call, storing a telephone number, changing the state of a device, playing audio corresponding to the translation of an identified object type, or the like) in response to detecting a hand gesture and particular vocal input. In various implementations, such as those shown in FIGS. 5G-5H, the device performs an action (e.g., playing audio corresponding to an identified word, playing audio corresponding to a definition of an identified word, or the like) in response to detecting a particular hand gesture without a corresponding vocal input.

Figure 6:
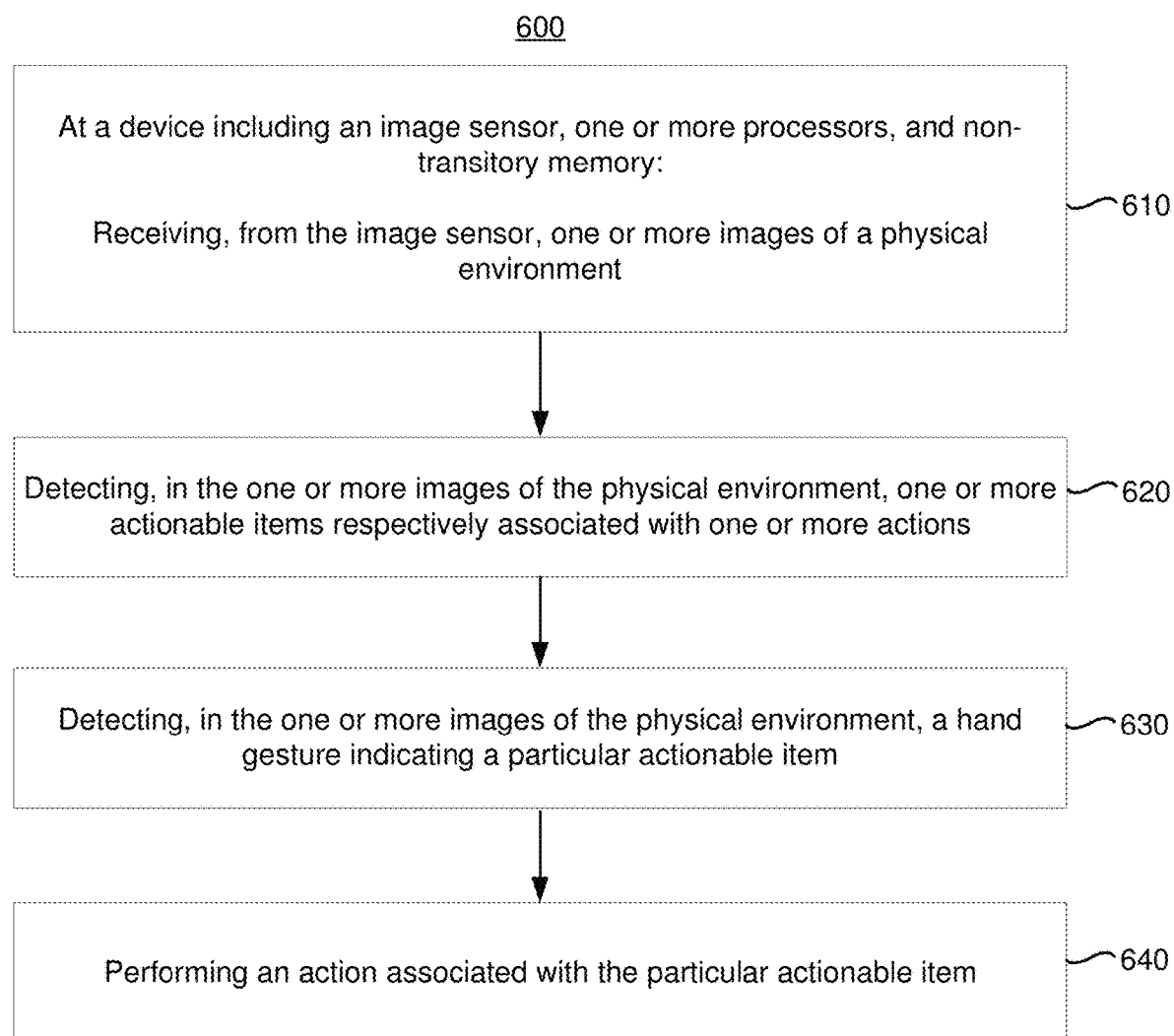
FIG. 6 is a flowchart representation of a method of performing an action in accordance with some implementations.

FIG. 6 is a flowchart representation of a method 600 of performing an action associated with an actionable item in accordance with some implementations. In various implementations, the method 600 is performed by a device including an image sensor, one or more processors, and non-transitory memory (e.g., the head-mounted device 150 of FIG. 1 or the earpiece 200 of FIG. 2). In various implementations, the method 600 is performed by a device without a display. In various implementations, the method 600 is performed by a device with a display. In various implementations, the method 600 is performed by processing logic, including hardware, firmware, software, or a combination thereof. In various implementations, the method 600 is performed by a processor executing instructions (e.g., code) stored in a non-transitory computer-readable medium (e.g., a memory).

The method 600 begins, in block 610, with the device receiving, from the image sensor, one or more images of a physical environment. For example, in FIG. 5A, the electronic device captures an image of the physical environment 401 of the office.

The method 600 continues, in block 620, with the device detecting, in the one or more images of the physical environment, one or more actionable items respectively associated with one or more actions. Each of the one or more actionable items is associated with at least one action. In various implementations, an actionable item is associated with more than one action. For example, in FIGS. 5A-5I, the lamp 412 is associated with a first action of changing a state of the lamp 412 and a second action of translating an object type of the lamp 412. As another example, in FIGS. 5A-5I, the word "vermilion" is associated with a first action of playing audio of a reading (or pronunciation) the word, a second action of playing audio of a definition of the word, a third action of playing audio of a translation of the word, and a fourth action of saving the word to memory (e.g., in a text note file).

In various implementations, detecting the one or more actionable items includes detecting machine-readable content. In various implementations, the machine-readable content includes text, a one-dimensional barcode, or a two-dimensional barcode. For example, in FIG. 5A, the device detects the text of the phone number of the first auto shop in the first window 431 displayed by the laptop 413, the text being associated with an action of calling the phone number of the first auto stop. As another example, in FIG. 5A, the device detects the QR code printed on the takeout menu 416, the QR code being associated with an action of opening a website having a URL encoded by the QR code.

In various implementations, detecting the machine-readable content includes determining an alphanumeric string based on the machine-readable content. In various implementations, the alphanumeric string includes data in a particular recognizable format, such as a phone number, an address, or a URL. In various implementations, the alphanumeric string includes data that matches data in a database, such as words in a dictionary or names in a list of artists.

In various implementations, detecting the one or more actionable items includes detecting an object. For example, in FIG. 5A, the electronic device detects the lamp 412 associated with an action of turning on or off the lamp 412. The object is separate from the device, however, the device may be in communication with the object.

The method 600 continues, in block 630, with the device detecting, in the one or more images of the physical environment, a hand gesture indicating a particular actionable item. For example, in FIG. 5A, the device detects the pointing hand gesture indicating the phone number of the third auto shop. As another example, in FIG. 5G, the device detects the swipe hand gesture indicating the word "vermilion".

The hand gesture can indicate the particular actionable item in various ways. In various implementations, the hand gesture is a static hand gesture indicating a location of the particular actionable item. For example, in FIG. 5A, the hand gesture is a pointing hand gesture in which the index finger is extended to terminate or point at the location of the actionable item and, in various implementations, the other digits of the hand are contracted. As another example, in various implementations, the hand gesture is a circle hand gesture in which one finger contacts the thumb to form a circle at the location and, in various implementations, the other digits of the hand are extended (e.g., an OK hand gesture) or parallel to the index finger (e.g., a zero hand gesture). In various implementations, the hand gesture is a dynamic hand gesture indicating a location of the actionable item. For example, in various implementations, the hand gesture is a tap hand gesture in which a finger moves towards the location of the actionable item. As another example, in various implementations, the hand gesture is a double-tap hand gesture in which a finger moves towards, then away from, then again towards the location of the action item. As another example, in FIG. 5G, the hand gesture is a swipe hand gesture in which one finger moves across (or below) the location of the actionable item. As another example, in FIG. 5H, the hand gesture is a circling hand gesture in which one finger moves around the location of the actionable item.

In various implementations, the method 600 excludes displaying one or more glints respectively associated with the one or more actionable items. Thus, in various implementations, detecting the one or more actionable items (in block 620) excludes displaying one or more glints respectively associated with the one or more actionable items. Similarly, in various implementations, detecting the hand gesture (in block 630) indicating the actionable item excludes displaying one or more glints respectively associated with the one or more actionable items and detecting the hand gesture indicating the particular actionable item excludes detecting the hand gesture indicating a glint associated with the particular actionable item.

The method 600 continues, in block 640, with the device performing an action associated with the particular actionable item. In various implementations, the particular actionable item is an object and performing the action includes changing a state of the object. For example, in FIG. 5E, in response to the hand gesture indicating the lamp 412 (and the vocal command) in FIG. 5D, the lamp 412 is turned on. In various implementations, changing the state of the object include turning the object on or off. In various implementations, changing the state of the object includes locking or unlocking the object (e.g., a door). In various implementations, changing the state of the object includes pausing or resuming playback of music by the object (e.g., a speaker).

In various implementations, performing the action includes playing audio based on the particular actionable item. In various implementations, the audio includes a reading of the particular actionable item. For example, in FIG. 5H, in response to the swipe hand gesture indicating the word "vermilion" in FIG. 5G, the device plays audio of the word "vermilion". In various implementations, the audio includes a definition of the particular actionable item. For example, in FIG. 5I, in response to the circling hand gesture indicating the word "vermilion" in FIG. 5H, the device plays audio of a definition of the word "vermilion", e.g., "a bright red color". In various implementations, the audio includes a translation of the particular actionable item. For example, in FIG. 5F, in response to the hand gesture indicating the lamp 412 (and the vocal command) in FIG. 5E, the device plays audio of a translation of the word "lamp", e.g., "la lámpara".

Thus, in various implementations, the particular actionable item is machine-readable content indicating text and playing audio based on the particular actionable item is based on the text. In various implementations, the particular actionable item is an object and playing audio based on the particular actionable item is based on text indicating an object type of the object.

In various implementations, performing the action includes initiating a phone call based on the particular actionable item. For example, in FIG. 5A, in response to the pointing hand gesture indicating the phone number of the third auto shop (and the vocal command), the device initiates a phone call with the phone number of the third auto shop. Thus, in various implementations, the particular actionable item is machine-readable content indicating a phone number and initiating a phone call based on the particular actionable item includes initiating a phone call with the phone number. In various implementations, the particular actionable item is an object (e.g., a photograph of a person) associated with a phone number and initiating the phone call based on the particular actionable item includes initiating a phone call with the phone number.

In various implementations, performing the action includes storing, in the non-transitory memory, information based on the particular actionable item. For example, in FIG. 5B, in response to the pointing hand gesture indicating the phone number of the third auto stop (and the vocal command), the device stores the phone number of the third auto shop as a contact. Thus, in various implementations, the particular actionable item is machine-readable content indicating a phone number and storing the information based on the particular actionable item includes storing the phone number as a contact. In various implementations, the particular actionable item is machine-readable content indicating text and storing the information based on the particular actionable item includes storing the text in a file (e.g., a note file).

In various implementations, performing the action includes selecting, based on the hand gesture, the action from a plurality of actions associated with the particular action item. For example, in FIG. 5H, in response to the swipe hand gesture of FIG. 5G, the device selects (and performs) a first action of playing audio of a reading of the word "vermilion" and in FIG. 5I, in response to the circling hand gesture of FIG. 5H, the device selects (and performs) a second action of playing audio of a definition of the word "vermilion". Thus, in various implementations, the method 600 includes detecting a first hand gesture indicating the particular actionable item; in response to detecting the first hand gesture, performing a first action associated with the particular action item; detecting a second hand gesture, different than the first hand gesture, indicating the particular actionable item; and, in response to detecting the second hand gesture, performing a second action, different than the first action, associated with the particular actionable item.

In various implementations, performing the action is further performed in response to a vocal command. For example, in FIG. 5E, in response to the pointing hand gesture indicating the lamp 412 and the vocal command to turn the indicated object on, the device turns on the lamp 412.

In various implementations, performing the action includes selecting, based on the vocal command, the action from a plurality of actions associated with the particular actionable item. For example, in FIG. 5E, in response to the pointing hand gesture indicating the lamp 412 and the vocal command to turn the indicated object on, the device selects (and performs) a first action of turning on the lamp 412 and, in FIG. 5F, in response to the pointing hand gesture indicating the lamp 412 and the vocal command to play audio of a translation of the object type of the indicated object, the device selects (and performs) a second action of playing audio of a translation of the word "lamp". As another example, in FIG. 5A, in response to the pointing hand gesture indicating the phone number of the third auto shop and the vocal command to call the indicated phone number, the device selects (and performs) a first action of initiating a phone call with the phone number of the third auto shop and, in FIG. 5B, in response to the pointing hand gesture indicating the phone number of the third auto shop and the vocal command to save the indicated phone number, the device selects (and performs) a second action of saving the phone number of the third auto shop as a contact. Thus, in various implementations, the method 600 includes detecting a hand gesture indicating the particular actionable item and a first vocal command; in response to detecting the first hand gesture and the first vocal command, performing a first action associated with the particular action item; detecting a hand gesture indicating the particular actionable item and a second vocal command different than the first vocal command; and, in response to detecting the hand gesture and the second vocal command, performing a second action, different than the first action, associated with the particular actionable item.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including an image sensor, one or more processors, and non-transitory memory:
receiving, from the image sensor, one or more images of a physical environment;
detecting, in the one or more images of the physical environment, one or more actionable items respectively associated with one or more actions, wherein detecting the one or more actionable items includes classifying the one or more actionable items to determine corresponding actions for the one or more actionable items, and wherein classifying the one or more actionable items includes performing computer vision on the one or more images of the physical environment;
detecting, in the one or more images of the physical environment, a first hand gesture selecting a particular actionable item of the one or more actionable items, the particular actionable item associated with a plurality of actions including a first action and a second action different from the first action;
in response to detecting the first hand gesture selecting the particular actionable item, without displaying a user interface element to perform the first action associated with the particular actionable item, performing the first action associated with the particular actionable item;
detecting, in the one or more images of the physical environment, a second hand gesture selecting the particular actionable item; and
in response to detecting the second hand gesture selecting the particular actionable item, without displaying a user interface element to perform the second action associated with the particular actionable item, performing the second action associated with the particular actionable item.

2. The method of claim 1, wherein detecting the one or more actionable items includes detecting machine-readable content.

3. The method of claim 1, wherein detecting the one or more actionable items includes detecting an object.

4. The method of claim 3, wherein performing the first action includes changing a state of the object.

5. The method of claim 1, wherein performing the first action includes playing audio based on the particular actionable item.

6. The method of claim 5, wherein the audio includes at least one of: a reading of the particular actionable item, a definition of the particular actionable item, or a translation of the particular actionable item.

7. The method of claim 1, wherein performing the first action includes initiating a phone call based on the particular actionable item.

8. The method of claim 1, wherein performing the first action includes storing, in the non-transitory memory, information based on the particular actionable item.

9. The method of claim 1, wherein performing the first action is further performed in response to a vocal command.

10. The method of claim 9, wherein performing the first action includes selecting, based on the vocal command, the first action from a plurality of actions associated with the particular actionable item.

11. The method of claim 1, wherein the device includes a communication interface, wherein the particular actionable item corresponds to another device, and wherein performing the first action includes transmitting data to the other device via the communication interface.

12. The method of claim 11, wherein the data indicates a request to change a state of the other device.

13. The method of claim 1, wherein the first hand gesture is a swipe hand gesture.

14. The method of claim 1, wherein the first hand gesture is a circling hand gesture.

15. The method of claim 1, wherein the first hand gesture is a tap hand gesture and the second hand gesture is a double-tap hand gesture.

16. The method of claim 1, wherein the first hand gesture is a circle hand gesture in which a finger contacts a thumb to form a circle.

17. A device comprising:
an image sensor;
a non-transitory memory; and
one or more processors to:
receive, from the image sensor, one or more images of a physical environment;
detect, in the one or more images of the physical environment, one or more actionable items respectively associated with one or more actions, wherein detecting the one or more actionable items includes classifying the one or more actionable items to determine corresponding actions for the one or more actionable items, and wherein classifying the one or more actionable items includes performing computer vision on the one or more images of the physical environment;
detect, in the one or more images of the physical environment, a first hand gesture selecting a particular actionable item of the one or more actionable items, the particular actionable item associated with a plurality of actions including a first action and a second action different from the first action;
in response to detecting the first hand gesture selecting the particular actionable item, without displaying a user interface element to perform a the first action associated with the particular actionable item, perform the first action associated with the particular actionable item;

detect, in the one or more images of the physical environment, a second hand gesture selecting the particular actionable item; and in response to detecting the second hand gesture selecting the particular actionable item, without displaying a user interface element to perform the second action associated with the particular actionable item, perform the second action associated with the particular actionable item.

18. The device of claim 17, wherein the one or more processors are to detect the one or more actionable items by detecting machine-readable content or an object.

19. The device of claim 17, wherein the device does not include a display.

20. A non-transitory memory storing one or more programs, which, when executed by one or more processors of a device including an image sensor cause the device to:

receive, from the image sensor, one or more images of a physical environment;

detect, in the one or more images of the physical environment, one or more actionable items respectively associated with one or more actions, wherein detecting the one or more actionable items includes classifying the one or more actionable items to determine corresponding actions for the one or more actionable items, and wherein classifying the one or more actionable items includes performing computer vision on the one or more images of the physical environment;

detect, in the one or more images of the physical environment, a first hand gesture selecting a particular actionable item of the one or more actionable items, the particular actionable item associated with a plurality of actions including a first action and a second action different from the first action;

in response to detecting the first hand gesture selecting the particular actionable item, without displaying a user interface element to perform a the first action associated with the particular actionable item, perform the first action associated with the particular actionable item;

detect, in the one or more images of the physical environment, a second hand gesture selecting the particular actionable item; and in response to detecting the second hand gesture selecting the particular actionable item, without displaying a user interface element to perform the second action associated with the particular actionable item, perform the second action associated with the particular actionable item.

* * * * *